(12) United States Patent
Malgorn et al.

(10) Patent No.: US 11,446,595 B2
(45) Date of Patent: Sep. 20, 2022

(54) FACIAL SEALING SYSTEM FOR A FILTER

(71) Applicant: Cummins Filtration IP, Inc., Columbus, IN (US)

(72) Inventors: Gérard Malgorn, Ergué Gabéric (FR); Pierrick Bonzi, Tregunc (FR); Travis E. Goodlund, McFarland, WI (US); Zemin Jiang, Cookville, TN (US); Gauthier Mestdag, Plogastel Saint Germain (FR); Stéphane Le Guyader, Briec (FR); Mano Sekar, Columbus, IN (US); Wassem Abdalla, Cookeville, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 16/343,345

(22) PCT Filed: Oct. 21, 2016

(86) PCT No.: PCT/US2016/058118
§ 371 (c)(1),
(2) Date: Apr. 18, 2019

(87) PCT Pub. No.: WO2018/075063
PCT Pub. Date: Apr. 26, 2018

(65) Prior Publication Data
US 2019/0240602 A1 Aug. 8, 2019

(51) Int. Cl.
*B01D 35/30* (2006.01)
*B01D 29/21* (2006.01)
*B01D 36/00* (2006.01)

(52) U.S. Cl.
CPC .............. *B01D 35/30* (2013.01); *B01D 29/21* (2013.01); *B01D 36/003* (2013.01);
(Continued)

(58) Field of Classification Search
CPC .................... B01D 35/30; B01D 35/306; B01D 2201/291; B01D 2201/295;
(Continued)

(56) References Cited

U.S. PATENT DOCUMENTS

| 4,740,299 A | 4/1988 | Popoff et al. |
| 5,250,179 A | 10/1993 | Spearman |

(Continued)

FOREIGN PATENT DOCUMENTS

| CN | 1269733 A | 10/2000 |
| CN | 101815566 A | 8/2010 |

(Continued)

OTHER PUBLICATIONS

International Search Report and Written Opinion issued for PCT/US2016/058118, dated Jan. 19, 2017, 12 pages.
(Continued)

*Primary Examiner* — Benjamin M Kurtz
(74) *Attorney, Agent, or Firm* — Foley & Lardner LLP

(57) ABSTRACT

A fuel filter system that does not require the periodic draining of a water sump. The system includes a fuel tank for storing fuel and a fuel filter fluidly coupled to the fuel tank for separating water from the fuel. A fuel pump has a suction side and a high pressure side. The high pressure side of the fuel pump is fluidly coupled to the fuel filter for pumping fuel to the fuel filter. A water emulsifier, such as an orifice, is fluidly coupled to the fuel filter to receive water and fuel from the fuel filter and form a water-fuel emulsion. The water-fuel emulsion is supplied to any point in the system on the suction side of the fuel pump, such that the water-fuel emulsion passes through the fuel pump and fuel filter.

21 Claims, 12 Drawing Sheets

(52) U.S. Cl.
CPC ......... *B01D 36/005* (2013.01); *B01D 36/006*
(2013.01); *B01D 2201/291* (2013.01); *B01D 2201/295* (2013.01); *B01D 2201/302* (2013.01); *B01D 2201/304* (2013.01); *B01D 2201/305* (2013.01); *B01D 2201/4084* (2013.01)

(58) Field of Classification Search
CPC ........ B01D 2201/302; B01D 2201/304; B01D 2201/305; B01D 2201/342; B01D 2201/40
See application file for complete search history.

(56) References Cited

U.S. PATENT DOCUMENTS

| | | | |
|---|---|---|---|
| 5,753,117 | A | 5/1998 | Jiang |
| 5,753,120 | A * | 5/1998 | Clausen ................. B01D 29/21 210/438 |
| 5,904,844 | A | 5/1999 | Stone |
| 6,096,207 | A | 8/2000 | Hoffman et al. |
| 6,235,194 | B1 | 5/2001 | Jousset |
| 6,843,377 | B1 | 1/2005 | Roll |
| 7,544,295 | B2 | 6/2009 | Zhu et al. |
| 7,585,408 | B2 | 9/2009 | Weindorf et al. |
| 7,819,258 | B2 | 10/2010 | Bae |
| 7,934,617 | B2 | 5/2011 | Minowa et al. |
| 8,057,669 | B2 | 11/2011 | Beard et al. |
| 8,147,691 | B2 | 4/2012 | Krull et al. |
| 8,153,000 | B2 | 4/2012 | Schmitt |
| 8,163,178 | B2 | 4/2012 | Thalmann |
| 8,714,142 | B2 | 5/2014 | Jacob et al. |
| 8,757,393 | B2 | 6/2014 | Thienel |
| 8,764,983 | B2 | 7/2014 | Jokschas et al. |
| 8,973,760 | B2 | 3/2015 | Ries et al. |
| 9,120,041 | B2 | 9/2015 | Greco et al. |
| 9,132,367 | B2 | 9/2015 | Honermann et al. |
| 9,199,187 | B2 | 12/2015 | Honermann et al. |
| 9,283,500 | B2 | 3/2016 | Sawant et al. |
| 9,333,448 | B2 | 5/2016 | Braunheim et al. |
| 10,238,999 | B2 * | 3/2019 | Malgorn ................. B01D 35/30 |
| 2011/0132828 | A1 | 6/2011 | Ries et al. |
| 2011/0132829 | A1 | 6/2011 | Tucker et al. |
| 2011/0139699 | A1 | 6/2011 | Tucker et al. |
| 2013/0056409 | A1 | 3/2013 | Sawant et al. |
| 2014/0190880 | A1 * | 7/2014 | Krull .................... B01D 29/111 210/236 |
| 2015/0090653 | A1 | 4/2015 | Kotale et al. |
| 2016/0082368 | A1 | 3/2016 | Morris et al. |
| 2016/0220931 | A1 * | 8/2016 | Ardes .................. B01D 35/153 |
| 2018/0326333 | A1 * | 11/2018 | Ardes .................... B01D 35/30 |

FOREIGN PATENT DOCUMENTS

| | | |
|---|---|---|
| CN | 101861193 A | 10/2010 |
| CN | 102089057 A | 6/2011 |
| CN | 103313767 A | 9/2013 |
| CN | 104153924 A | 11/2014 |
| CN | 105051362 A | 11/2015 |
| EP | 2 135 659 | 12/2009 |
| WO | WO 2008/074812 | 6/2008 |
| WO | WO-2015/050540 | 4/2015 |
| WO | WO 2015/135767 | 9/2015 |

OTHER PUBLICATIONS

Supplementary European Search Report issued for European Patent Application No. EP 16919222.6, dated Mar. 19, 2020, 13 pages.
First Office Action for Chinese Patent App. No. 201680090134.4 dated Oct. 10, 2020, 16 pages (with translation).

* cited by examiner

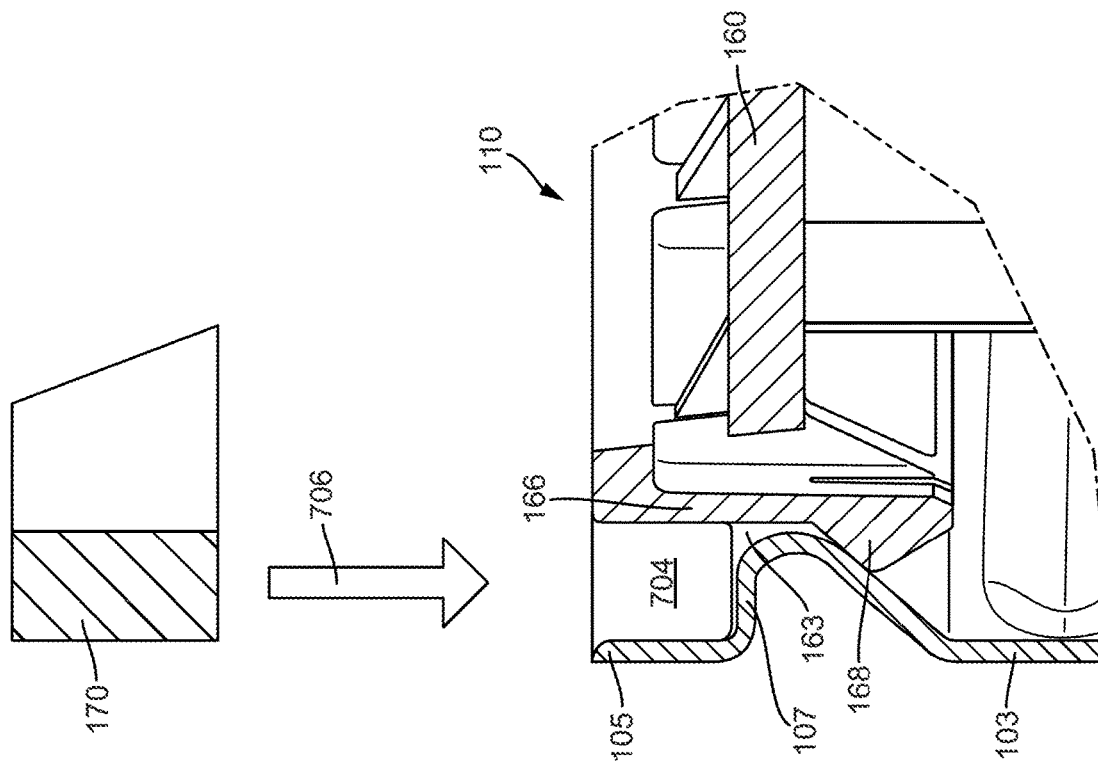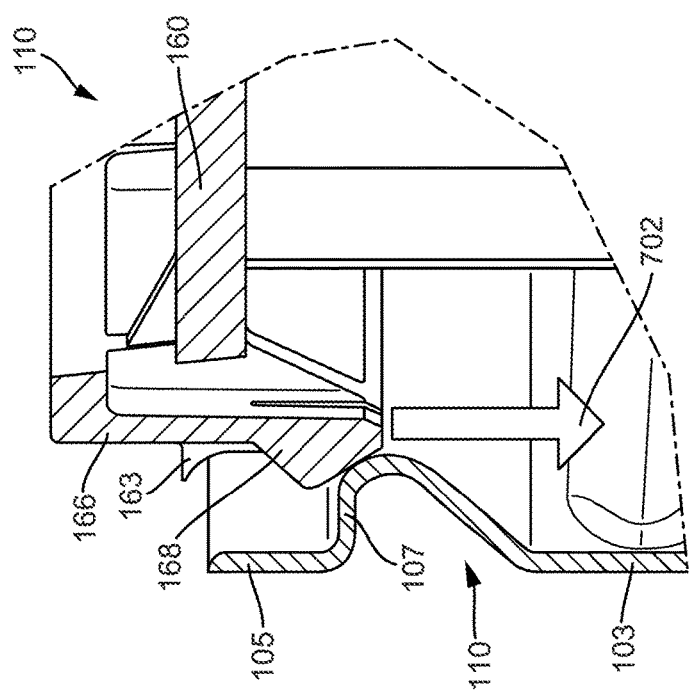

FACIAL SEALING SYSTEM FOR A FILTER

CROSS-REFERENCE TO RELATED APPLICATIONS

This application is a National Phase of PCT Application No. PCT/US2016/058118, filed Aug. 21, 2016, the contents of which are herein incorporated by reference in its entirety.

FIELD

The present disclosure relates generally to filtration systems for use in filtering fluids such as fuel and the like.

BACKGROUND

Internal combustion engines generally combust a mixture of fuel (e.g., diesel, gasoline, natural gas, etc.) and air. Prior to entering the engine, the fuel is typically passed through a filter element to remove particulate matter (e.g., dust, metal particles, debris, etc.) from the fuel prior to combustion. Similarly, lubricant or lube (e.g., engine oil) provided to the engine may also be passed through a filter element so as to remove particulate matter from the lube before communicating to the engine. The fuel or oil may include water, which may accumulate in the filter and may have to be removed.

Filter assemblies generally comprise one or more nut plates configured to be positioned on a first end or a second end of a housing of the filter assembly. The nut plates are structured to provide a mechanism for coupling of a filter head to a first end of the housing of the filter assembly, or provide coupling of a cover or bowl to a bottom end of the filter housing. The one or more nut plates introduce additional parts into the filter assembly and may increase manufacturing complexity and manufacturing cost of such filters.

SUMMARY

One example embodiments relates to a filter assembly comprising a housing and a filter element. The housing defines an internal volume. At least one male thread is formed in a housing first end of the housing. The filter element is positioned within the internal volume of the housing. The filter element comprises filter media and a first end cap coupled to a filter media first end of the filter media. The first end cap comprises a base, a first axial sidewall, a second axial sidewall and a first end cap flange. The first axial sidewall extends from the base towards the filter media. The first axial sidewall is positioned inwardly from an outer edge of the first end cap. The second axial sidewall extends from the outer edge of the base towards the filter media and is spaced apart from the first axial sidewall. The filter media first end is positioned between the first axial sidewall and the second axial sidewall. The first end cap flange is positioned about a periphery of the base. The first end cap flange extends from the base away from the filter element. A first end sealing member is positioned between an outer surface of the first end cap flange and an inner surface of the housing first end. The first end sealing member forms a seal between the housing and the first end cap.

Another example embodiment relates to a filter element configured to be positioned within an internal volume of a shell housing. The filter element comprises filter media and a first end cap coupled to a filter media first end of the filter media. The first end cap comprises a base. The first end cap further comprises a first axial sidewall extending from the base towards the filter media. The first axial sidewall is positioned inwardly from an outer edge of the first end cap. The first end cap comprises a second axial sidewall extending from the outer edge of the base towards the filter media and spaced apart from the first axial sidewall. The filter media first end is positioned between the first axial sidewall and the second axial sidewall. The first end cap further comprises a first end cap flange positioned about a periphery of the base. The first end cap flange extends from the base away from the filter media.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing in this disclosure are contemplated as being part of the subject matter disclosed herein.

BRIEF DESCRIPTION OF THE FIGURES

References are made to the accompanying drawings that form a part of this disclosure, and which illustrate the embodiments in which the systems and methods described in this specification can be practiced.

FIG. 7A and FIG. 7B each show a cross-sectional views of a portion of the housing first end of the filter assembly and the filter cartridge during the installation process.

DETAILED DESCRIPTION

Embodiments described herein relate generally to filter assemblies comprising a housing have a plurality of female threads positioned on a bottom or second end thereof, and a clear bowl which comprises male threads configured to be removably coupled to the housing.

Embodiments of the filter assembly described herein that comprise a housing having a bottom bowl. The housing including the male and female threads, and/or the first end plate may provide benefits including, for example: (1) allowing direct coupling of the bowl and the filter head to the housing, thereby allowing exclusion of nut plates between the bowl and the housing second end of the filter assembly, and between the filter head and the housing first end of the housing; (2) molding one or more female or male threads into the housing so as to simplify manufacturing of the filter assembly; (3) forming a groove via a combination of a ledge defined in a sidewall of a housing first end of the housing, a protrusion extending from a sidewall of a first end cap of the filter element, and a circumferential groove defined in the filter head within which a first end sealing member may be positioned for sealing the first end cap to the housing and filter head; and (4) reducing a manufacturing cost of assembly cost of the filter assembly by reducing the number of parts included in the filter assembly. In some arrangements, the bottom bowl may be clear, transparent, or translucent. In other arrangements, the bottom bowl is opaque.

Figure 1:
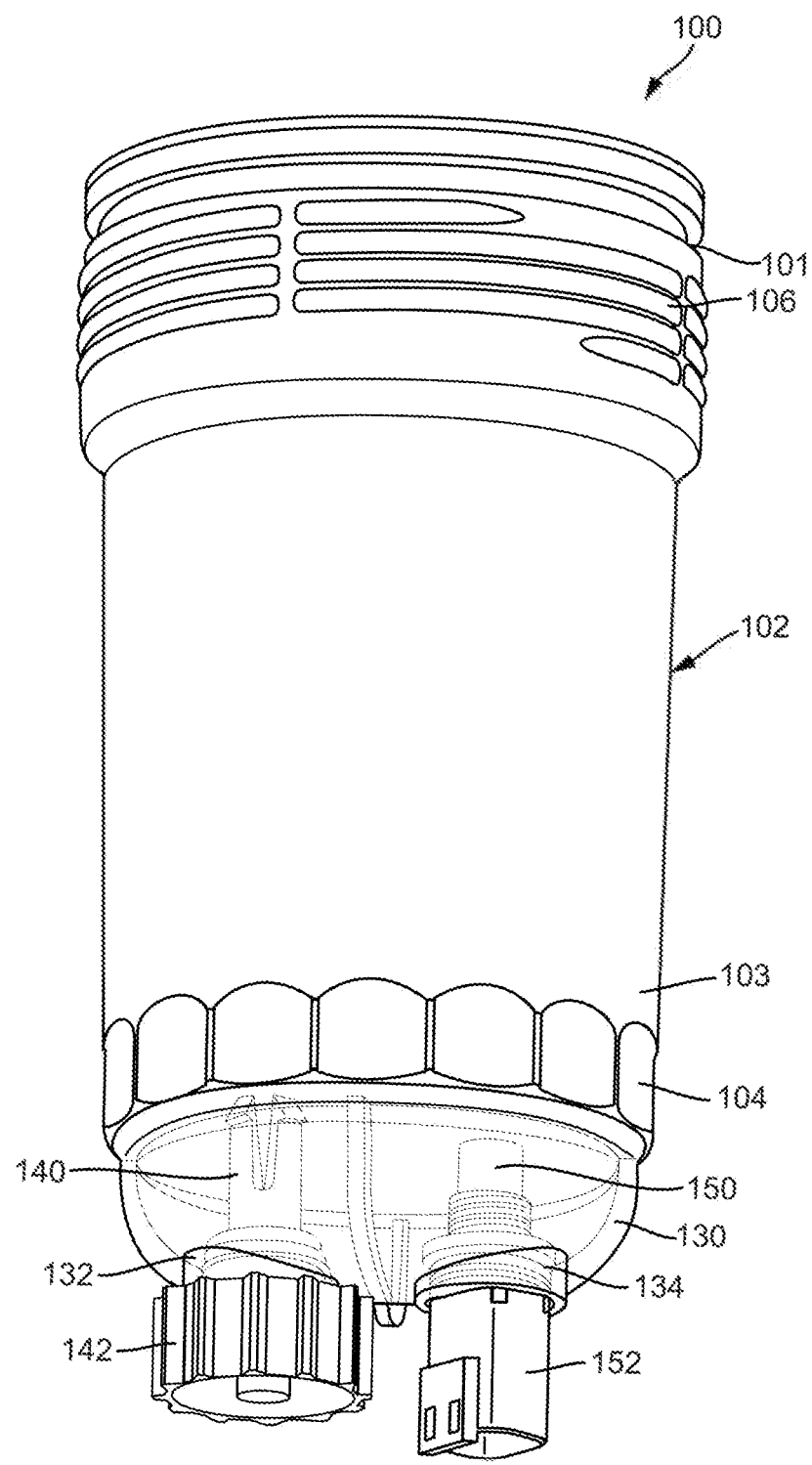
FIG. 1 is a perspective view of a filter assembly, according to an embodiment.
Figure 2A:
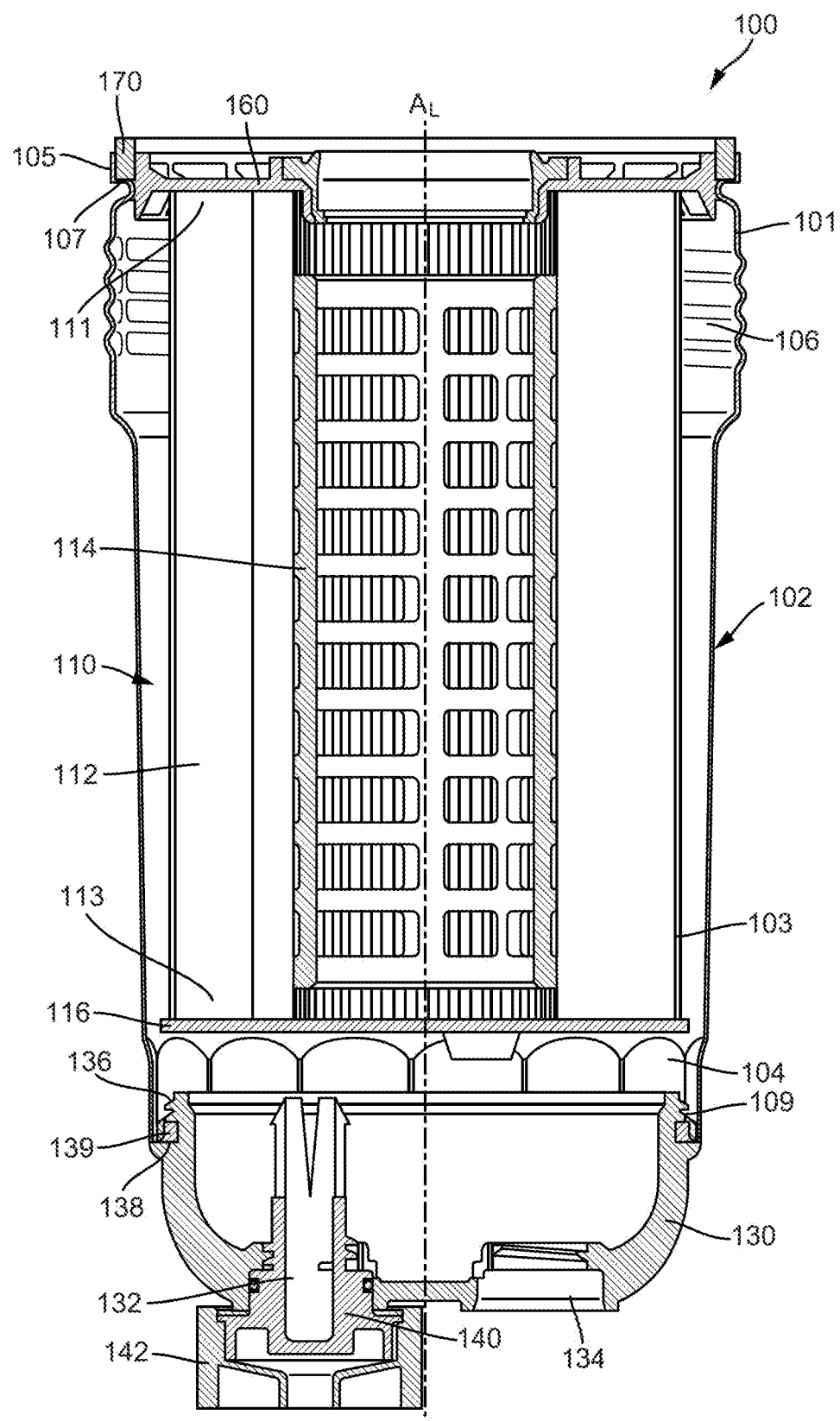
FIG. 2A is a side cross-sectional view of the filter assembly of FIG. 1.
Figure 2B:
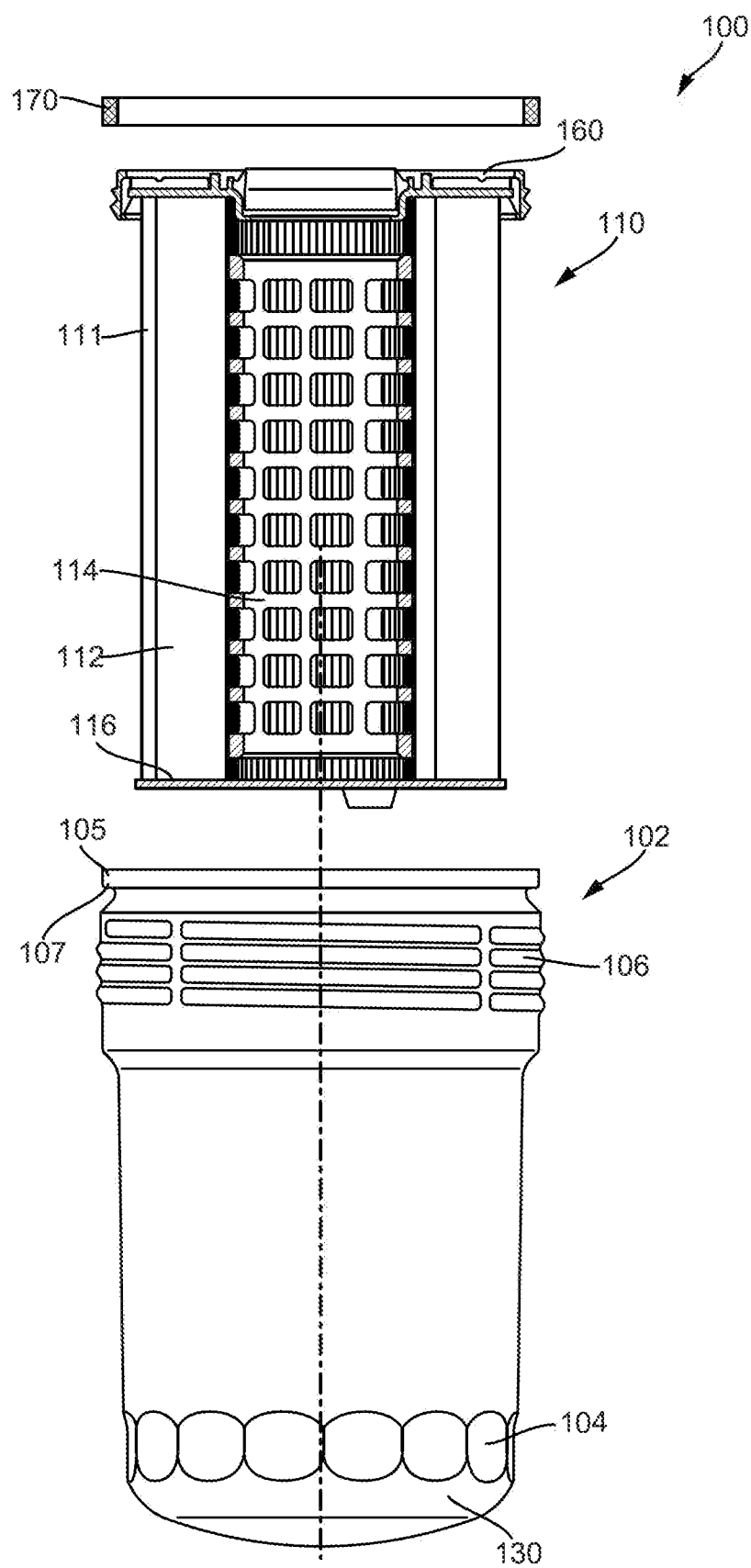
FIG. 2B is a partial cross-sectional exploded view of the filter assembly of FIG. 1.

FIG. 1 is a perspective view, FIG. 2A is a side cross-sectional view, and FIG. 2B is a partial cross-sectional exploded view, of a filter assembly 100. The filter assembly 100 comprises a housing 102, a filter element 110 and a bowl 130.

The housing 102 defines an internal volume within which the filter element 110 is positioned. The housing 102 may be formed from a strong and rigid material, for example plastics (e.g., polypropylene, high density polyethylene, polyvinyl chloride, etc.), metals (e.g., aluminum, stainless steel, etc.), or any other suitable material. In particular embodiments, the housing 102 may comprise a cylindrical housing having generally a circular cross-sectional. In other embodiments, the housing 102 may have any suitable shape, for example square, rectangular, polygonal, etc.

Figure 4:
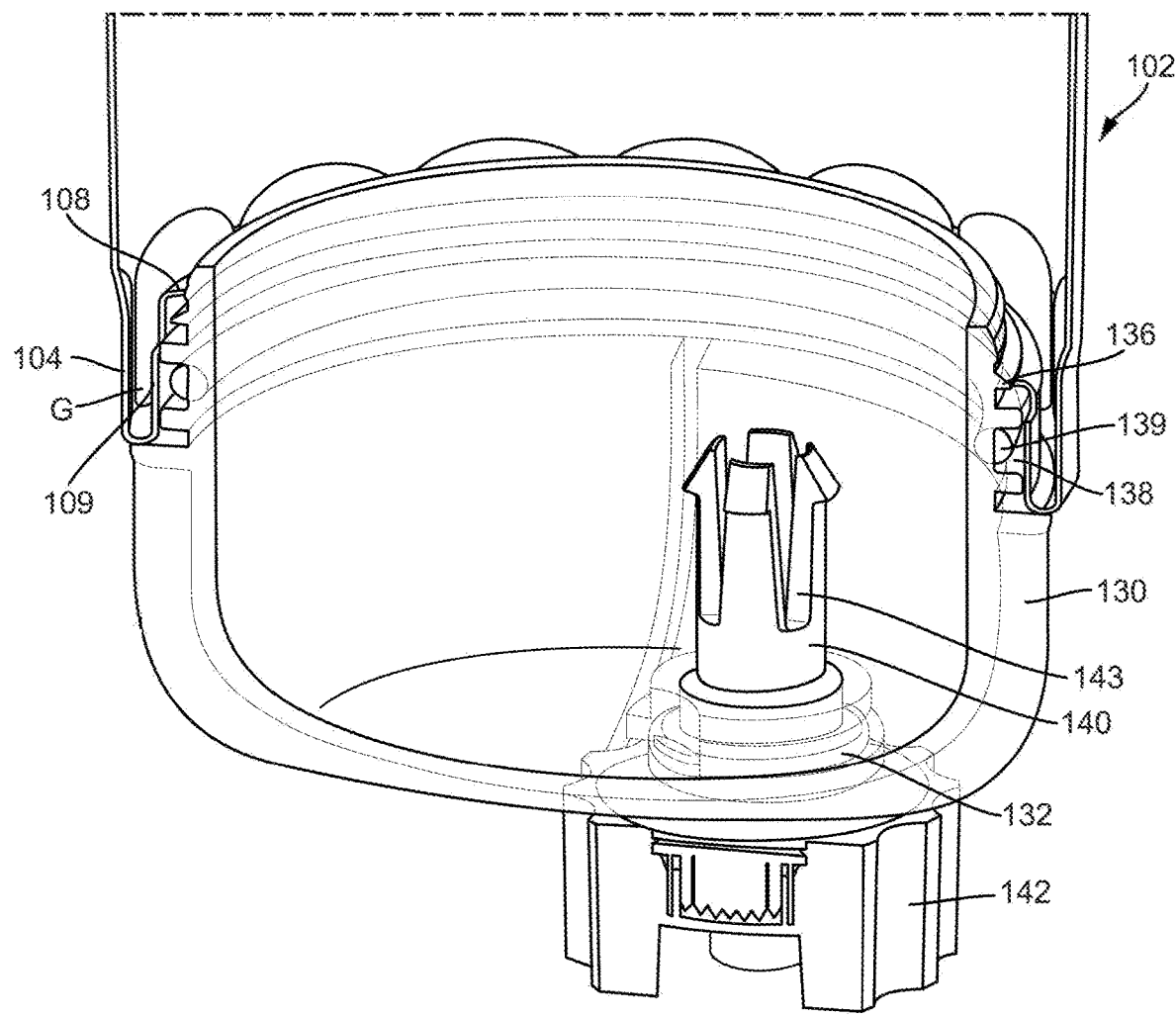
FIG. 4 is a side cross-sectional view of a bottom or second end of the filter assembly of FIG. 1 to show female threads positioned on an inner surface of the second end of a housing of the filter assembly of FIG. 1, and a sealing member positioned between the bowl and the housing.

The housing 102 comprises a housing top or first end 101 and a housing bottom or second end 103. The housing first end 101 comprises at least one male thread 106 provided on an outer surface thereof. In some arrangements, the at least one male thread 106 is stamped into the housing 102. In other arrangements, the at least one male thread 106 may be molded or otherwise formed into a sidewall of the housing 102. The housing second end 103 comprises at least one female thread 108 (FIG. 4). The bowl 130 is positioned at the housing second end 103, and comprises at least one bowl male thread 136 structured to engage the at least one female thread 108 of the housing 102 so as to be coupled to the housing second end 103.

A plurality of indentations 104 or depressions may be formed on an outer surface of the housing second end 103. For example, the plurality of indentations 104 may comprise axial indentations defined circumferentially about the housing second end 103. The plurality of indentations 104 may be positioned with any suitable spacing between each adjacent indentation (i.e., any positioned at any suitable pitch). The plurality of indentations 104 may serve to facilitate gripping of the housing 102 for coupling and/or uncoupling the housing, for example to a filter head (e.g., the filter head 180 or 280 described herein).

A portion 109 of the sidewall of the housing 102 at the housing second end 103 may be folded inwards and positioned within the internal volume of the housing 102 parallel to the plurality of indentations 104. In some embodiments, the portion 109 of the sidewall may be positioned such that a gap G is defined between the plurality of indentations 104 and the portion 109 of the sidewall. In other embodiments, the portion 109 may be positioned flush with or abutting the plurality of indentations 104 so as to eliminate the gap G. A ledge may extend from an end of the portion 109 of the sidewall towards a longitudinal axis AL of the filter assembly 100. The ledge may be positioned within the internal volume of the housing 102 and may form the at least one female thread 108. Accordingly, the at least one female thread 108 is an internally facing female thread 108. The female thread 108 may be formed during a deep draw machining process used to form the housing 102. In some arrangements, the female thread 108 includes two threads per turn.

As described above, the bowl 130 comprises at least one bowl male thread 136 on an outer surface thereof. The at least one bowl male thread 136 is structured to removably engage the at least one female thread 108, for example provided by the ledge formed by the end of the portion 109 of the sidewall of the housing 102, so as to be coupled to the housing second end 103. Accordingly, the bowl 130 can be reused with multiple different housings 102 (e.g., during filter servicing, the bowl 130 can be removed from a used housing 102, which is discarded, and reattached to a new housing 102 having the mating internal female thread 108). In some arrangements, the bowl 130 may be formed from at least one of a translucent or a transparent material, for example, thin plastic, plexiglass, acrylic, etc. The transparent, substantially transparent or translucent bowl 130 may allow a user to visually observe if water or any other contaminants are accumulated in the bowl 130. In other arrangements, the bowl 130 may be formed from an opaque material, such as plastic or metal.

As described herein the term "transparent" means that the bowl 130 is formed from a material that allows visible light to be transmitted therethrough without appreciable scattering so that the internal volume of the bowl may be seen so that approximately 100% of visible light incident on the surface of the bowl 130 is transmitted therethrough. The term "substantially" used in combination with transparent implies that the small imperfections in transparency of the bowl 130 are tolerable such that the bowl 130 may be considered substantially transparent if the bowl allows more than 85% of the light incident on a surface of the bowl 130 to pass therethrough. As used herein, the word "translucent" implies that the bowl 130 is not completely transparent, but allows some light to pass through, for example less than 85% of light incident on the surface of the bowl 130 to pass therethrough. As used herein, the word "opaque" implies that the bowl 130 is not transparent or translucent and does not allow for visible light to pass through the solid portions of the bowl 130.

A base of the bowl 130 may have a hemispherical or other curved or contoured shape. Water, dirt, debris, organic matter, etc. may collect in the base of the bowl 130 and may be removed therefrom, as described herein.

The bowl 130 may also comprise a bowl groove 138 positioned circumferentially about an outer surface of the bowl 130 below the at least one bowl male thread 136. For example, a pair of circumferential protrusions may be defined on the outer surface of the bowl 130. The pair of circumferential protrusions may be separated by a predetermined space which forms the bowl groove 138. A sealing member 139 may be positioned within the bowl groove 138 so as to provide a radial seal between the housing 102 and the bowl 130.

In some embodiments, the seal formed by the sealing member 139 may comprise a "leak-tight" seal or a "substantially" leak-tight seal. As used herein, the term "leak-tight" is understood to encompass both a hermetic seal (i.e., a seal that is gas-impervious) as well as a seal that is liquid-impervious. The term "substantially" when used in connection with "leak-tight" is intended to convey that, while total fluid imperviousness is desirable, some minimal leakage due to manufacturing tolerances, or other practical considerations (such as, for example, the pressure applied to the seal and/or within the fluid), can occur even in a "substantially leak-tight" seal.

As described above, a number of filter assemblies generally comprise a nut plate positioned between a housing of the filter assembly and a bowl. In contrast, the at least one female thread 108 of the housing 102 of the filter assembly 100, and the at least one bowl male thread 136 of the bowl 130 allow direct coupling of the bowl 130 to the housing second end 103 such that the filter assembly 100 does not comprise a nut plate coupling the housing 102 to the bowl 130.

As shown in FIGS. 2A-B, 3A-B, and 4, the bowl 130 further comprises a first port 132 structured to receive a drain plug 140, and a second port 134 structured to receive a water-in-fuel sensor 150. The first port 132 and second port 134 may have the same shape and size so that the drain plug 140 and the water-in-fuel sensor 150 may be interchangeably inserted in either one of the first port 132 or the second port 134. A drain cap 142 may be coupled to the drain plug 140. The drain cap 142 may be removably coupled to the first port 132 (e.g., via threads) so as to removably position the drain plug 140 within the first port 132. In some arrangements, the drain plug 140 is replaced with a drain valve that can be manually or automatically operated to drain fluid that gathers in the bowl 130 (e.g., to drain water separated from fuel).

In various embodiments, the drain plug may comprise a plurality of drain plug clips 143. The drain plug clips 143 may be configured to engage a rim of the first port 132 once the drain plug 140 is inserted into the first port 132, so as to prevent the drain plug 140 from being completely removed from the first port 132 once the drain cap 142 is uncoupled (e.g., unscrewed) from the first port 132.

The water-in-fuel sensor 150 may comprise a humidity sensor, a resistivity sensor, a conductivity sensor, or any other suitable water sensor configured to determine if a water level collected in the bowl 130, or included in a fluid (e.g., air, oil or fuel) passing through the filter assembly 100 is above a predetermined level. The water-in-fuel sensor 150 also comprises an electronic coupler 152 positioned outside the internal volume defined by the bowl 130. The electronic coupler 152 may be configured to be removably coupled to the second port (e.g., via threads). The electronic coupler 152 is structured to allow communicative coupling of the water-in-fuel sensor 150 to a controller (e.g., an onboard diagnostic computing device) via electrical leads. In other embodiments, the electronic coupler 152 may comprise a wireless electronic coupler configured to electronically couple the water-in-fuel sensor 150 to the controller via a wireless connection (e.g., a BLUETOOTH®, low powered BLUETOOTH®, ZigBee®, or Wi-Fi® connection) or a wired connection (e.g., CANBUS, USB, J1939 vehicle bus, Ethernet, etc.).

Figure 3A:
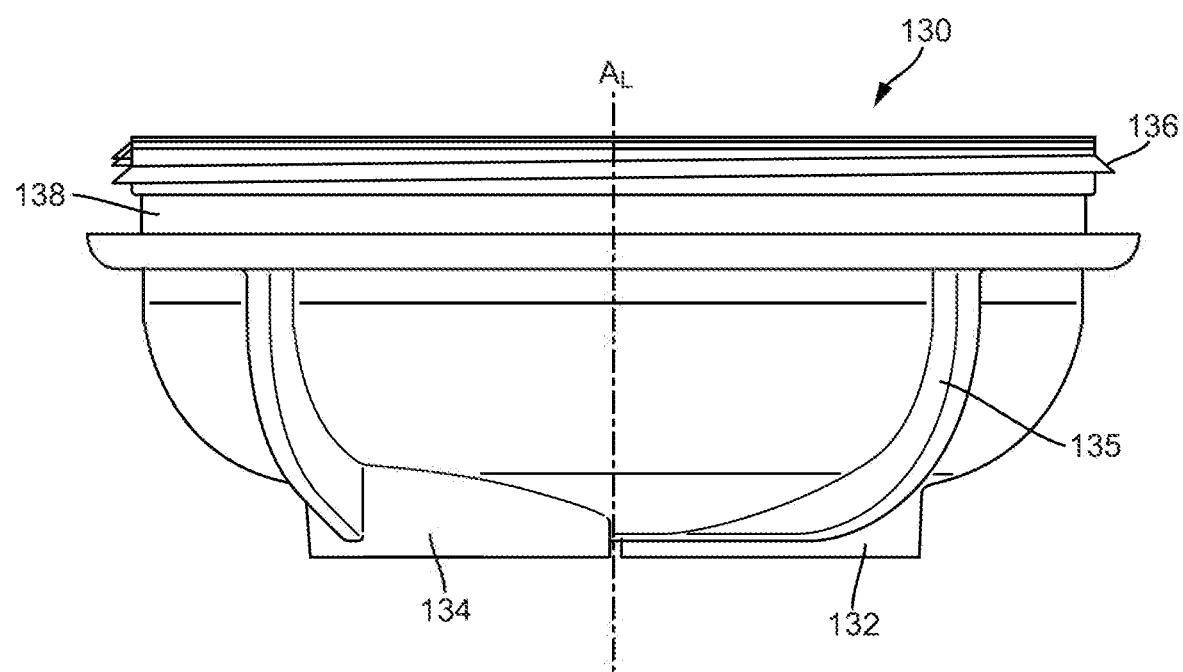
FIG. 3A is a side view.
Figure 3B:
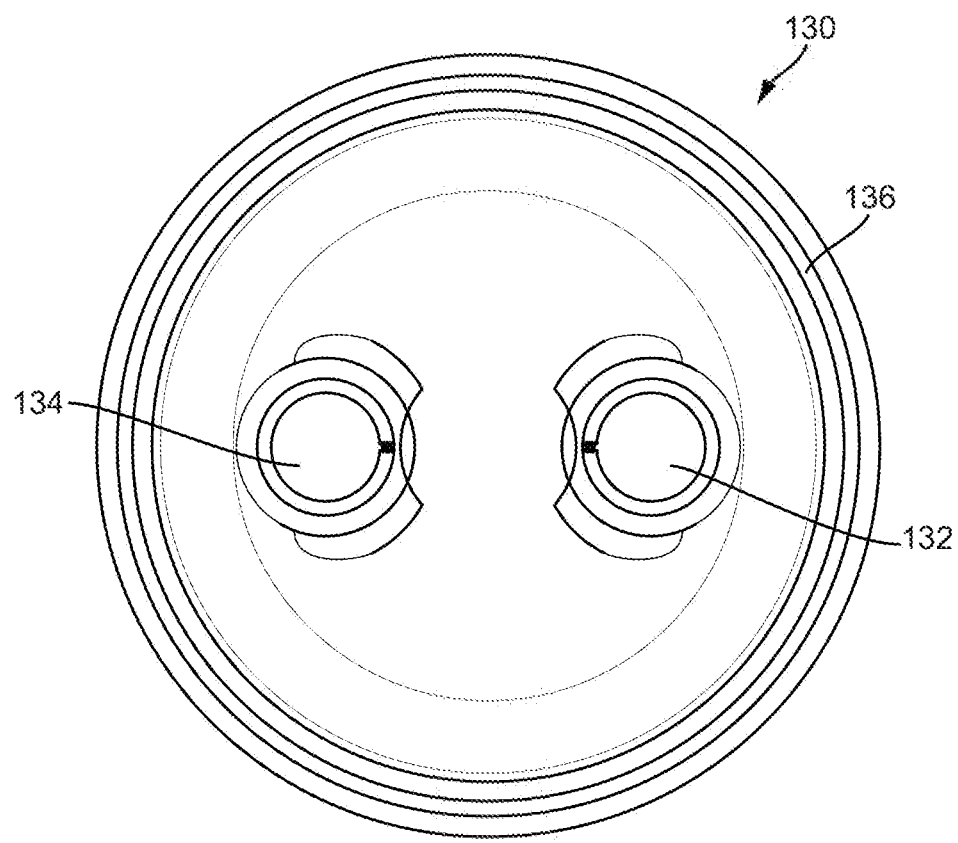
FIG. 3B is a top view, of a bowl included in the filter assembly of FIG. 1.

The bowl 130 may further comprise a plurality of axial ribs 135 provided on an outer surface of the bowl, as shown in FIG. 3A. The plurality of axial ribs 135 may provide structural strength to the bowl 130 which may allow reduction of an overall thickness of the sidewalls of the bowl 130. The plurality of axial ribs 135 may also serve as grips to facilitate a user in coupling and/or uncoupling of the bowl 130 from the housing 102.

The filter element 110 is positioned within the internal volume of the housing 102. The filter element 110 comprises a filter media 112, a first end cap 160 coupled to a filter media first end 111 proximate to the housing first end 101, and optionally, a second end cap 116 coupled to a filter media second end 113 proximate to the housing second end 103. The filter media 112 comprises a porous material having a predetermined pore size and is configured to filter particulate matter from a fluid such as air flowing therethrough. The filter media 112 may comprise pleated media, corrugated media, or variations thereof.

The filter media 112 may have a shape and size corresponding to a shape defined by the internal volume of the housing 102 (e.g., a cylindrical shape having a circular cross-sectional). The filter media 112 may comprise a filter core 114 having a filter channel, around which the filter media 112 is positioned. The filter core 114 may comprise a plurality of apertures so as to allow the fluid (e.g., air, fuel, oil etc.) to flow into the filter channel after passing through the filter media 112. The filter core 114 may be formed from plastic, metals or any other suitable material. In some embodiments, the filter channel may be configured to receive at least a portion of a center tube (not shown), for example from an engine configured to receive the fluid (e.g., air, fuel or lubricant) filtered by the filter media 112.

The first end cap 160 is coupled to the filter media first end 111. The first end cap 160 may be formed from any suitable material, for example plastics, metals, rubber, reinforced rubber, polymers etc. The first end cap 160 may have a cross-sectional corresponding to the cross-sectional of the housing 102.

Figure 5B:
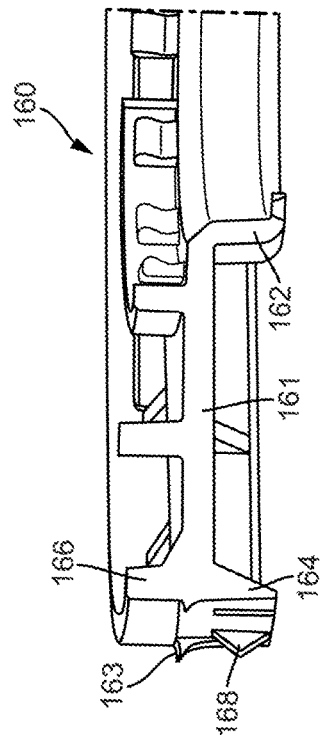
FIG. 5B is a side cross-sectional view of a portion of a first end cap of the filter assembly.
Figure 5C:
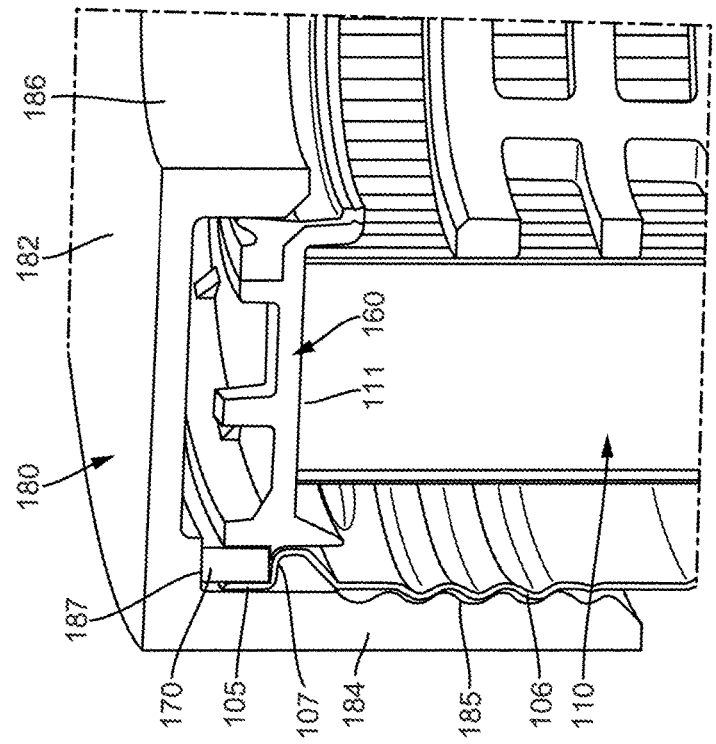
FIG. 5C is a side cross-sectional view of a portion of the filter assembly of FIG. 1, with the first end cap positioned within an internal volume of the housing first end, a first end sealing member positioned between the housing and the first end cap, and a filter head screwed onto the housing first end.
Figure 5A:
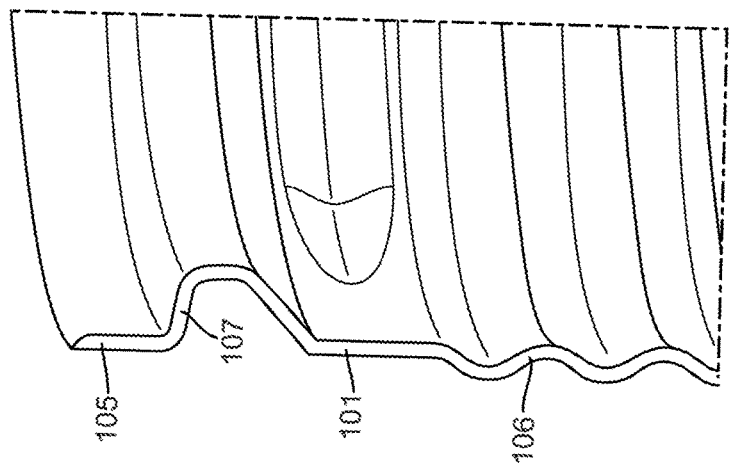
FIG. 5A is a side cross-sectional view of a first end or top end of the housing of FIG. 1 opposite the second or bottom end of the filter assembly.
Figure 8:
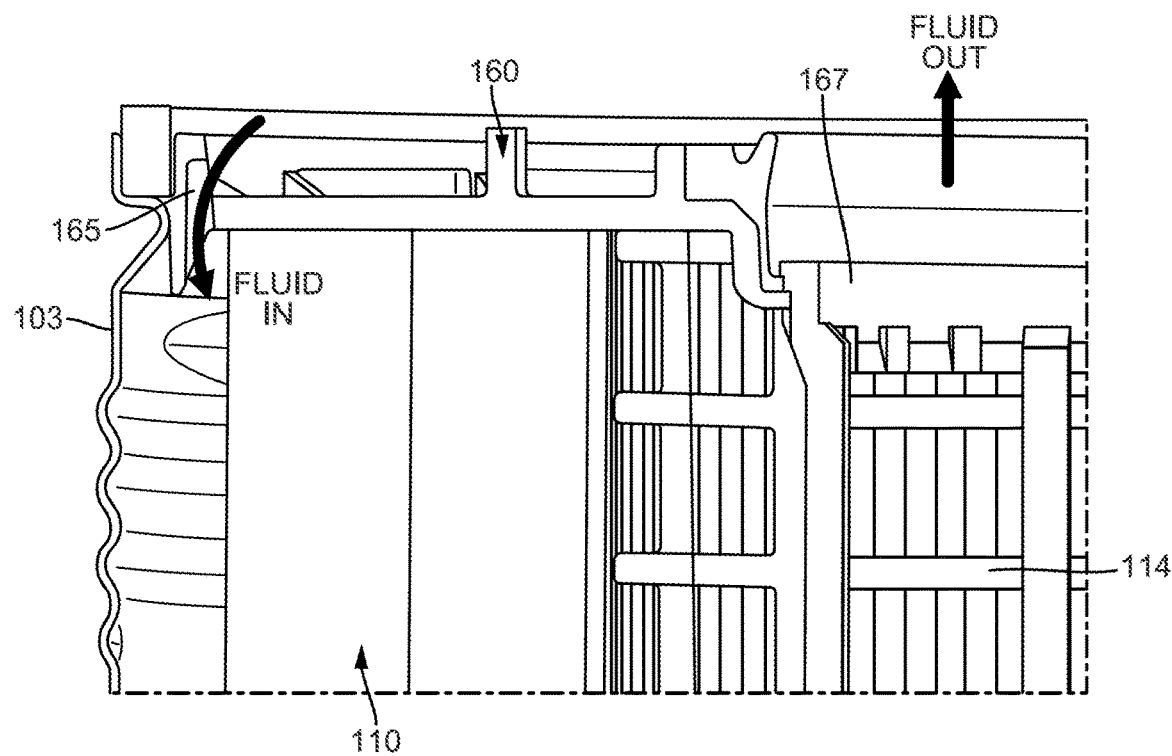
FIG. 8 is another side cross-sectional view of a portion of the housing first end showing a fluid inlet defined in the first end cap.

As shown in FIGS. 5A and 5B, the first end cap 160 comprises a base 161 and a first axial sidewall 162 extending from the base 161 towards the filter media 112. The first axial sidewall 162 is positioned inwardly from an outer edge of the base 161 of first end cap 160. For example the first axial sidewall 162 may comprise a circular sidewall extending from the base 161, and define a fluid outlet 167 about the longitudinal axis AL of the filter assembly 100, as shown in FIG. 8. The center tube (not shown) may be positioned in the outlet 167 so as to provide an outlet conduit for the filtered fluid to be expelled from the housing 102.

The first end cap 160 further comprises a second axial sidewall 164 extending from the outer edge of the base 161 towards the filter media 112. The second axial sidewall 164 is spaced apart from the first axial sidewall 162. The filter media first end 111 may be positioned between the first axial sidewall 162 and the second axial sidewall 164. For example, the second axial sidewall 164 may be concentric with the first axial sidewall 162 and separated therefrom so that a circumferential space is defined between the first axial sidewall 162 and the second axial sidewall 164. The filter media first end 111 may be positioned in the space between the first axial sidewall 162 and the second axial sidewall 164. In some embodiments, the filter media first end 111 may be fixedly coupled to the base 161 of the first end cap 160, for example via an adhesive, heat bonded or fusion bonded to the first end cap 160.

A first end cap flange 166 is positioned about a periphery of the base 161. The first end cap flange 166 extends from the base 161 away from the filter media 112. For example, the first end cap flange 166 may comprise a circular sidewall extending from the base 161 away from the filter media 112 about the periphery of the first end cap 160. In some arrangements, the first end cap flange 166 is circumferentially in line with the second axial side wall 164. A protrusion 163 extends away from the outer surface of the first end cap flange 166. As described in further detail below, the protrusion 163 prevents the filter element 110 from being inserted too deep into the housing 102. Additionally, the protrusion 163 forms a support surface for the first end sealing member 170.

As shown in FIG. 5C, a first end sealing member 170 is positioned in a U-shaped channel 704 (shown in FIG. 7B) between an outer surface of the first end cap flange 166, and an inner surface of the housing first end 101. The first end sealing member 170 forms a seal between the housing 102 and the first end cap 160, for example a leak-tight seal. The first end sealing member 170 may comprise a machine cut gasket having any suitable cross-sectional, for example rectangular cross-sectional or a circular cross-sectional (e.g., an O-ring). In some arrangements, the first end sealing member 170 is a square cut gasket having a rectangular or square cross-sectional shape.

The housing 102 also comprises a housing ledge 107 positioned circumferentially about the first end 101 of the housing 102 above the at least one male thread 106. The housing ledge 107 may extend into the internal volume of the housing 102. For example, the housing ledge 107 may comprise a circumferential ledge extending into the inner volume of the housing 102 from the housing first end 101. The housing ledge 107 may be formed by molding (e.g., in arrangements where the housing 102 is a molded plastic housing), stamping (e.g., in arrangements where the housing 102 is a metal component), or the like.

Moreover, the housing 102 may also comprise a housing flange 105 positioned circumferentially about an outer periphery of the housing ledge 107. The housing flange 105 extends axially away from the at least one male thread 106 of the housing 102 parallel to the longitudinal axis AL such that the housing ledge 107 and the housing flange 105 define an L-shaped groove. At least a portion of the first end sealing member 170 is positioned within the L-shaped groove.

The at least one male thread 106, the housing ledge 107 and the housing flange 105 may be molded into the housing 102. The housing ledge 107 may be fabricated by molding a circumferential depression into the housing first end 101. The circumferential depression may comprise the radial housing ledge 107 extending orthogonally from the housing 102 towards the internal volume of the housing 102, and an inclined sidewall extending from the housing ledge 107 towards the at least one male thread 106 of the housing 102, such that the circumferential depression and the housing ledge 107 have a cross-sectional resembling the numeral "7."

The first end cap flange 166 is positioned concentric with the housing flange 105 such that the housing flange 105, the housing ledge 107, the protrusion 163, and the first end cap flange 166 define a U-shaped channel 704 (shown in FIG. 7B) for receiving the first end sealing member 170. The U-shaped channel 704 is formed by components of both the housing 102 and the first end cap 160 of the filter element 110.

Figure 6B:
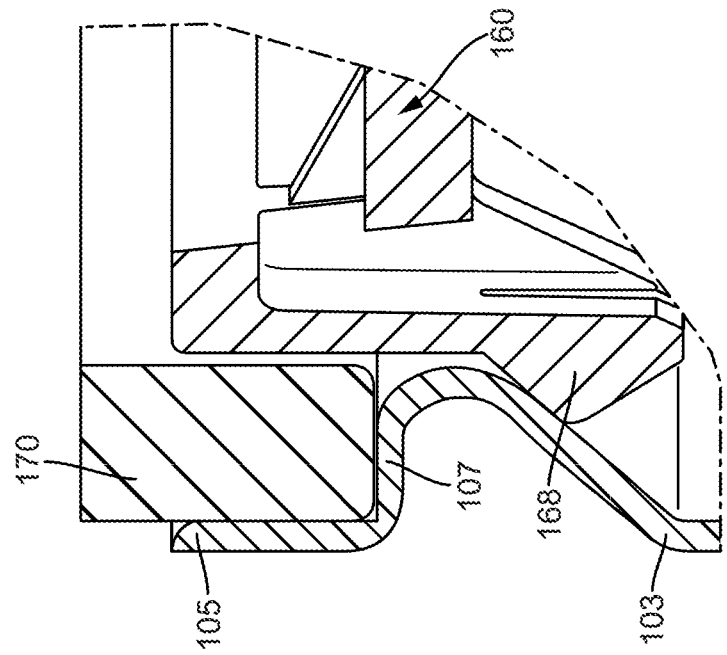
FIG. 6B is another side cross-sectional view of the portion of the housing first end showing a clip of the first end cap structured to engage a bottom surface of the ledge so as to secure the filter element within the internal volume of the housing.
Figure 6A:
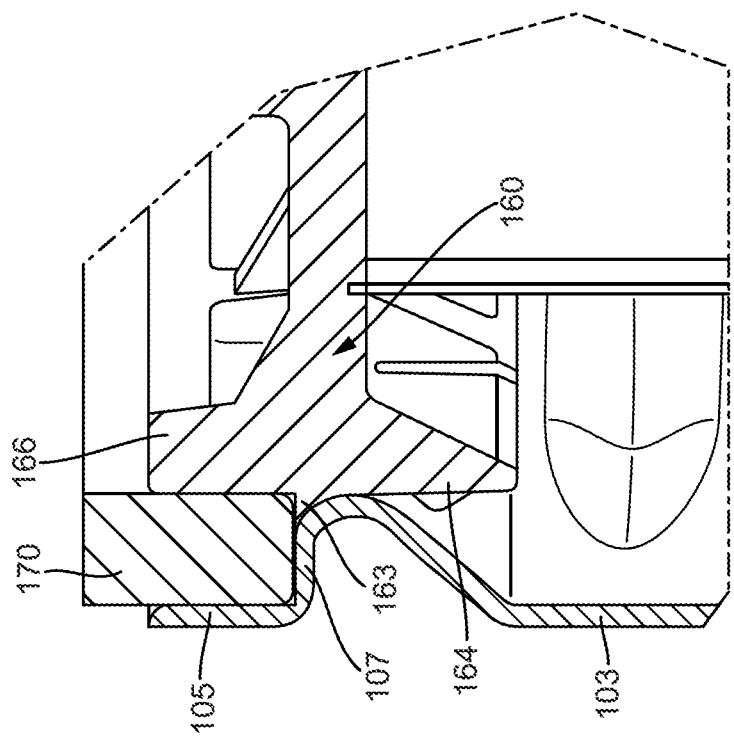
FIG. 6A is a side cross-sectional view of a portion of the housing first end of the filter assembly showing a protrusion extending radially from the first end cap structured to engage a top surface of the ledge defined on the housing.

In some embodiments, the first end cap 160 may further comprises a protrusion 163 extending from at least a portion of the first end cap flange 166 towards the housing 102, as shown in FIGS. 5B and 6A. The protrusion 163 is engagable with a top surface of the housing ledge 107 so as to limit insertion of the filter element 110 into the internal volume defined by the housing 102 beyond a predetermined distance. In some embodiments, the protrusion 163 may comprise a continuous circumferential protrusion, thereby providing a stop ring for limiting insertion of the filter element 110 into the internal volume of the housing 102. In other embodiments, the first end cap 160 may comprise a plurality of protrusions 163 positioned at predetermined locations on the first end cap flange 166 and extending radially therefrom.

The first end cap 160 may further comprise at least one clip 168 positioned on the second axial sidewall 164 of the first end cap 160, as shown in FIG. 6B. The at least one clip 168 may be removably engagable with the housing ledge 107, so as to removably secure the first end cap 160, and thereby the filter element 110 within the housing 102. For example, the at least one clip 168 may be structured to engage a bottom surface of the housing ledge 107, for example the inclined sidewall extending from the ledge 169 towards the at least one male thread 106 of the housing 102. In another embodiment, the filter element 110 may be permanently secured within the housing 102. In some embodiments, the first end cap 160 may further comprise a fluid inlet 165 provided in the base 161 adjacent to the second axial sidewall 164 and the fluid outlet 167 (See FIGS. 8 and 9) defined within the first axial sidewall 162.

Referring to FIGS. 7A and 7B, cross-sectional views of assembling the filter element 110 within the housing 102 are shown. As shown in FIG. 7A, the filter element 110 is inserted into the housing 102 along the longitudinal axis AL (the longitudinal axis AL is shown in FIG. 2A) in the direction of the arrow 702. As the filter element 110 is inserted into the housing 102, the clips 168 interact with the housing ledge 107 and bend inwardly (e.g., towards the longitudinal axis AL). Once the peak of the clip 168 passes the ridge formed by the housing ledge 107 of the housing 102, the filter element 110 slides into an installed position, which is shown in FIG. 7B. The protrusion 163 positioned on the first end cap flange 166 abut an upper surface of the housing ledge 107, which prevents the filter element 110 from being inserted beyond the installed position shown in FIG. 7B. In the installed position, a gap exists between the second end cap 116 and a bottom of the housing 102 (e.g., as shown in FIG. 2A). After the filter element 110 is positioned in the installed position within the housing 102, a U-shaped channel 704 (in cross-sectional shape) is formed by the housing flange 105, the housing ledge 107, the protrusion 163, and the first end cap flange 166. Accordingly, the U-shaped channel 704 is formed by components of both the housing 102 and the filter element 110. The first end sealing member 170 is then installed into the U-shape channel 704 along the direction of arrow 706. The first end sealing member 170 is shown in the installed position in FIGS. 6A and 6B.

Figure 9:
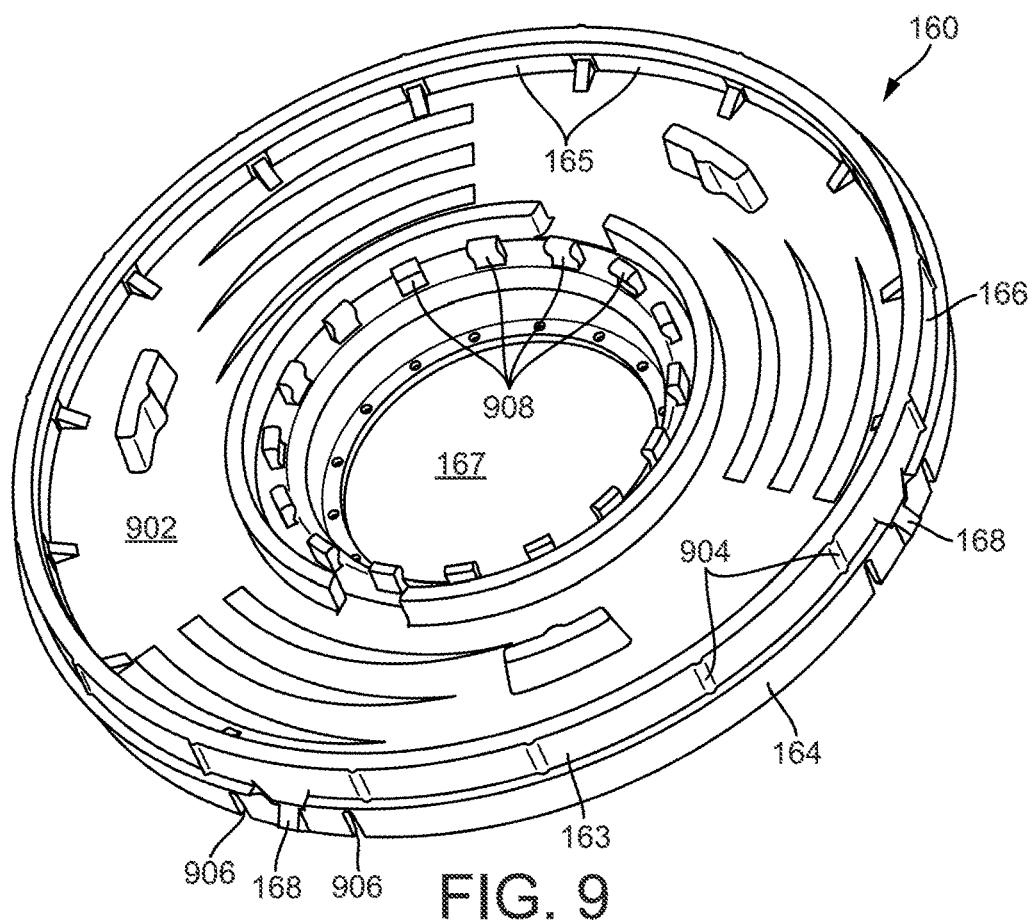
FIG. 9 is a perspective view of the first end cap of the filter assembly of FIG. 1.

Referring to FIG. 9, a perspective view of the first end cap 160 is shown. As shown in FIG. 9, the first end cap 160 includes a main body 902 having a central fluid outlet 167. The main body 902 includes the first end cap flange 166 that forms an outer circumference of the first end cap 160. In some arrangements, the first end cap flange 166 includes a plurality of vertical ridges 904 that extend outwardly from the outer surface of the first end cap flange 166. The vertical ridges 904 help to secure the first end sealing member 170 in the U-shaped channel 704. The first end cap 160 includes the protrusion 163 that forms a portion of the bottom of the U-shaped channel 704. In some arrangements, the protrusion 163 extends around the entire circumference of the first end cap flange 166. In other arrangements, the protrusion 163 does not extend around the entire circumference of the first end cap flange 166 and is broken adjacent to the plurality of clips 168. The breaks in the protrusion 163 provided additional flexibility to the clips 168 such that the clips 168 can flex during the installation process of the filter element 110 into the housing 102 (e.g., as described above with respect to FIGS. 7A and 7B). To provide added flexibility to the clips 168, the second axial sidewall 164 of the first end cap 160 may include a plurality of cutaways 906 positioned on opposing sides of each clip 168. As discussed above with respect to FIG. 8, the main body 902 also includes a plurality of fluid inlets 165. In some arrangements, an inner seal (not shown) can be overmolded onto a plurality of tabs 908 surrounding the central fluid outlet 167. In other arrangements, the main body 902 does not include the plurality of tabs 908, and an inner seal is positioned where the tabs 908 are shown in FIG. 9. In such arrangements, the inner seal may be a square cut gasket having a similar cross section to the first end sealing member 170 (as described above).

Referring to FIG. 5C, a filter head 180 may be removably coupled to the housing first end 101 of the housing 102. The filter head 180 comprises a filter head base 182, an opening 186 provided in the filter head base 182 (e.g., to receive a center tube), and a filter head sidewall 184 extending from an outer periphery of the filter head base 182 towards the housing 102. At least one female thread 185 is provided on an inner surface of the filter head sidewall 184. The at least one female thread 185 of the filter head 180 is configured to engage the at least one male thread 106 so as to removably couple the filter head 180 to the housing first end 101.

In some embodiments, a circumferential groove 187 is defined on the filter head base 182, for example on a first surface of the filter head base 182 of the filter head 180 facing the first end cap 160. The circumferential groove 187 is structured to receive at least a portion of the first end sealing member 170, such that the first end sealing member 170 may seal each of the housing 102, the first end cap 160 and the filter head 180. The filter head sidewall 184 may also exert a radial force onto the first end 101 of the housing 102 which may push the housing flange 105 towards the first end sealing member 170 and the first end cap, thereby enhancing the sealing provided by the first end sealing member 170.

Figure 10:
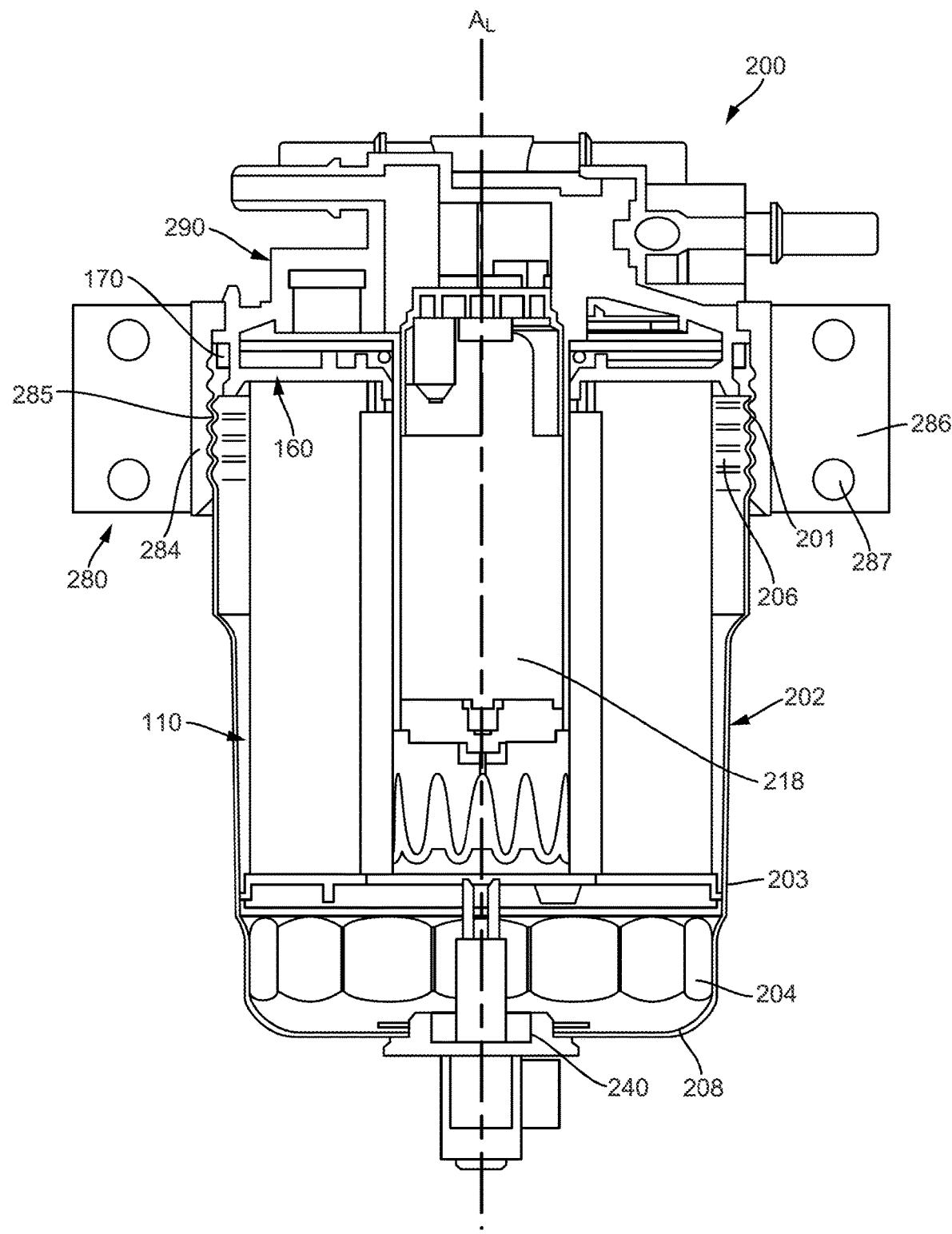
FIG. 10 is a side cross-sectional view of another embodiment of a filter assembly.
Figure 11:
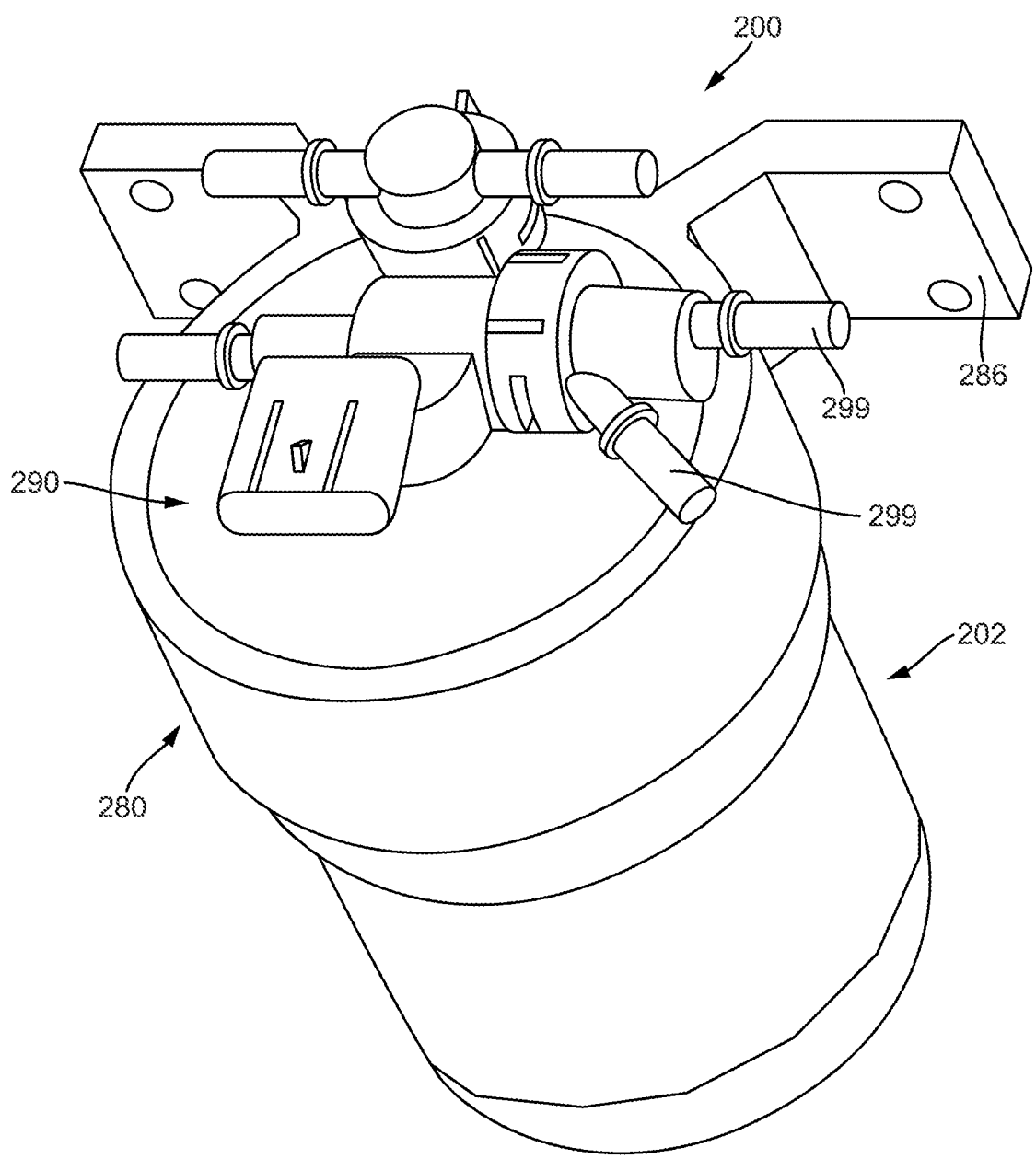
FIG. 11 is a top, perspective view of the filter assembly of FIG. 10.

In some embodiments, a housing of a filter assembly may be formed to integrally comprise a bowl shaped base so that a separate detachable bowl as described with respect to the filter assembly 100 is not required. For example, FIG. 10 is a side cross-sectional view, and FIG. 11 is a top perspective view of another embodiment of a filter assembly 200. The filter assembly 200 comprises a housing 202, the filter element 110 as described before with respect to the filter assembly 100, a filter head first portion 280, and a filter head second portion 290.

The housing 202 defines an internal volume within which the filter element 110 is positioned. The housing 202 may be formed from a strong and rigid material, for example plastics (e.g., polypropylene, high density polyethylene, polyvinyl chloride, etc.), metals (e.g., aluminum, stainless steel, etc.), polymers (e.g., reinforced rubber, silicone) or any other suitable material. In particular embodiments, the housing 202 may comprise a cylindrical housing having generally a circular cross-sectional. In other embodiments, the housing 202 may have any suitable shape, for example square, rectangular, polygonal, etc.

The housing 202 comprises a housing top or first end 201 and a housing bottom or second end 203. The housing first end 201 comprises a plurality of male threads 206. The housing first end 201 may be substantially similar to the housing first end 101 of the housing 102 and, therefore not described in further detail herein. The housing second end 203 comprises a housing base 208 integrally formed with the housing 202. At least one port 240 may be defined in the housing base 208 so as to receive a drain plug (e.g., the drain plug 140) and/or the water-in-filter sensor (e.g., the water-in-fuel sensor 150). The housing base 208 may be flat, or otherwise curved or contoured to resemble a bowl. The housing base 208 may serve as a reservoir for collecting water, dirt, debris, etc. so that a separate bowl (e.g., the bowl 130) is not used in the filter assembly 200.

A plurality of axial indentations 204 or depressions may be defined on an outer surface of the housing first end 203 parallel to a longitudinal axis AL of the housing 202. For example, the plurality of indentations 204 may comprise axial indentations defined circumferentially about the housing second end 203 with any suitable spacing between each adjacent indentation (i.e., positioned at any suitable pitch). The plurality of indentations 204 may serve to facilitate gripping of the housing 202 for coupling and/or uncoupling the filter assembly 200, for example to an engine block of an engine, and/or provide structural strength to the housing 202.

The filter element 110 is positioned within the internal volume defined by the housing 202. A center pipe or tube 218 may be positioned within at least a portion of a filter channel defined by the filter element 110. The center tube 218 may be coupled to the filter head second portion 290, for example fluidly coupled to a fluid outlet defined in the filter head second portion 290, and serve to provide an outlet for filtered fluid to be removed from the filter assembly 200.

Figure 12:
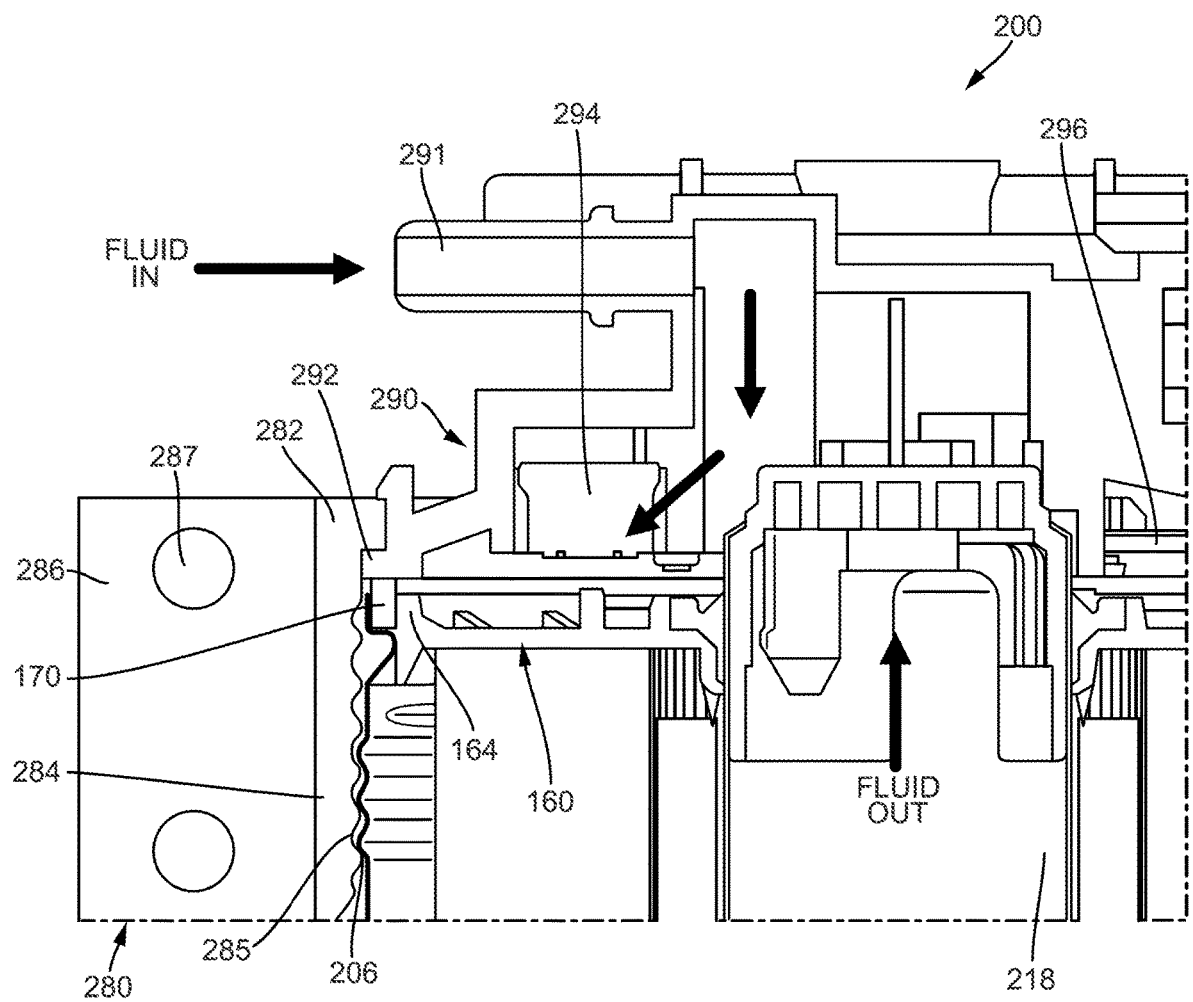
FIG. 12 is a side cross-sectional view of a portion of the filter assembly of FIG. 10.

Referring to FIGS. 10-12, the filter head first portion 280 is removably coupled to the housing first end 201. The filter head first portion 280 comprises a filter head first portion sidewall 284 defining a circular ring like structure configured to be positioned around the housing first end 201. At least one female thread 285 is defined on an inner surface of the filter head first portion sidewall 284. The at least one female thread 285 is configured to engage the at least one male thread 206 of the housing 202 so as to removably couple the filter head first portion 280 to the housing first end 201.

A plurality of arms 286 (e.g., a pair of arms 286 as shown in FIGS. 10-11) are coupled to the filter head first portion sidewall 284, and extend away therefrom. Each of the plurality of arms 286 defines at least one aperture 287. A fastener (e.g., a screw, bolt, rivet, pin, etc.) may be inserted through the aperture 287 so as allow coupling or mounting of the filter assembly 200 onto a structure (e.g., a frame or an engine block).

The filter head second portion 290 is positioned over the first end cap 260 secured to the housing first end 201 via the filter head first portion 280. The filter head second portion 290 may be referred to as a base of the filter head. In this manner, the filter head first portion 280 and the filter head second portion 290 cooperatively define a filter head of the filter assembly 200. The filter head second portion 290 may be formed from a different material then the filter head first portion 280. For example, the filter head first portion 280 may be formed from a metal (e.g., aluminum, stainless steel, alloys, etc.), and the filter head second portion 290 may be formed from a plastic, or polymer.

The filter head second portion 290 may comprise a circumferential projection 292 extending outwardly from an outer periphery of the filter head second portion 290. Furthermore, the filter head first portion 280 comprises a filter head first portion flange 282 extending orthogonally from a first end of the filter head first portion 280. The filter head first portion flange 282 may be located proximate to the filter head second portion 290 and extends towards the filter head second portion 290.

The filter head first portion flange 282 is structured to overlap and engage the circumferential projection 292 of the filter head second portion 290 so as to secure the filter head second portion 290 on the housing first end 201 over the first end cap 160 of the filter element 110. The filter head first portion flange 282 may also compress the circumferential projection 292 of filter housing second portion 290 towards the first end sealing member 170 positioned in the U-shaped groove define by the housing first end 201 and the first end cap 160, as previously described in detail herein, so as to ensure a seal (e.g., a leak-tight or substantially leak-tight seal) between the filter head second portion 290, the housing 202 and the first end cap 160. In some embodiments, a circumferential groove may be defined on a first surface of the filter head second portion 290 facing the first end cap 160. The circumferential groove may be located proximate to the circumferential projection 292 and structured to receive at least portion of the first end sealing member 170.

The filter head second portion 290 further comprises an inlet for receiving an unfiltered fluid (e.g., air, oil, fuel, etc.) and communicates the fluid to the filter media 112 via the fluid inlet 165 provided in the first end cap 160. A thermostat 294 and a heater 296 may be positioned in the filter head second portion 290. The thermostat 294 may comprise, for example a thermistor, a bimetallic strip, a semi-conductor thermostat or any other suitable thermostat. The thermostat 294 may be operatively coupled to a temperature sensor configured to sense a temperature of the fluid entering the filter housing second portion 290.

The heater 296 may comprise a solid state heater, a sandwich heater or any other suitable heater. The thermostat 294 may be operatively coupled to the heater 296 and may be configured to activate the heater 296 when the temperature of the fluid flowing into the filter assembly 200 drops below a predetermined temperature so as to heat the fluid. In some embodiments, the thermostat 294 and the heater 296 may be configured to maintain the temperature of the fluid flowing into the filter assembly 200 within a predetermined range.

The center tube 218 may be coupled to the filter housing second portion 290 such that when the filter housing second portion 290 is positioned on the housing first end 201, the center tube 218 is positioned within the filter channel. The filter housing second portion 290 may also comprise one or more fluid outlets 299 (FIG. 11). The center tube 218 may be fluidly coupled to the fluid outlets 299 and structured to communicate filtered fluid received from the filter media 112 to the fluid outlets 299 so as to be communicated to a point of use.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed:

1. A filter assembly, comprising:
a housing defining an internal volume, at least one male thread formed in a housing first end of the housing, the housing comprising a housing ledge positioned circumferentially about the housing first end above the at least one male thread, the housing ledge extending into the internal volume of the housing, the housing comprising a housing flange positioned circumferentially about an outer periphery of the housing ledge and extending away from the at least one male thread such that the housing ledge and the housing flange define an L-shaped groove;
a filter element positioned within the internal volume of the housing, the filter element comprising:
filter media; and
a first end cap coupled to a filter media first end of the filter media, the first end cap comprising:
a base,
a first axial sidewall extending from the base towards the filter media, the first axial sidewall positioned inwardly from an outer edge of the first end cap,
a second axial sidewall extending from the outer edge of the base towards the filter media and spaced apart from the first axial sidewall, the filter media first end positioned between the first axial sidewall and the second axial sidewall, at least one clip positioned on the second axial sidewall, the at least one clip configured to removably engage with the ledge so as to removably secure the first end cap, and thereby the filter element, within the housing, a first end cap flange positioned about a periphery of the base and circumferentially aligned with the second axial sidewall, the first end cap flange engaged with and extending axially away from an upper surface of the base and away from the filter media, and a protrusion extending radially away from an outer surface of the first end cap towards the housing, the outer surface defined by the first end cap flange and the second axial sidewall and oriented substantially perpendicular to the base, the protrusion disposed on the outer surface at an intermediate axial position between the first end cap flange and the second axial sidewall, the protrusion engaged with the housing ledge such that a top surface of the protrusion and a top surface of the housing ledge together define a substantially planar surface, wherein the protrusion does not extend along the second axial sidewall adjacent to the at least one clip; and a first end sealing member positioned between an outer surface of the first end cap flange and an inner surface of the housing first end, the first end sealing member engaging each of the first end cap flange, the protrusion, the housing ledge, and the housing flange, the first end sealing member forming a seal between the housing and the first end cap.

2. The filter assembly of claim 1, wherein the first end cap flange is positioned concentric with the housing flange, and wherein the housing flange, the housing ledge, the protrusion, and the first end cap flange define a U-shape that receives the first end sealing member.

3. The filter assembly of claim 2, the protrusion engaged with a top surface of the ledge so as to limit insertion of the filter element into the internal volume defined by the housing beyond a predetermined distance.

4. The filter assembly of claim 1, wherein the base includes a central fluid opening, the end cap further comprising a plurality of tabs positioned between the first end cap flange and the central opening and surrounding the central fluid opening.

5. The filter assembly of claim 1, wherein the second axial sidewall of the first end cap includes a first cutaway positioned on a first side of a clip of the at least one clip, and a second cutaway positioned on a second side of the clip, the first cutaway and the second cutaway allowing the clip to flex during installation of the filter element into the housing.

6. The filter assembly of claim 5, wherein at least one section of the second axial sidewall does not include any clips along any portion of the at least one section.

7. The filter assembly of claim 1, wherein the first end cap further comprises:

a fluid inlet defined in the base adjacent to the second axial sidewall; and a fluid outlet defined within the first axial sidewall.

8. The filter assembly of claim 1, further comprising:

a filter head to which the housing first end is removably coupled, the filter head comprising:

a filter head base; and a filter head sidewall extending from an outer periphery of the filter head base towards the housing, a plurality of female threads defined on the filter head sidewall and structured to engage the at least one male thread of the housing so as to removably couple the filter head to the housing first end.

9. The filter assembly of claim 8, wherein a circumferential groove is defined on the filter head base, the circumferential groove structured to receive at least a portion of the first end sealing member.

10. The filter assembly of claim 8, wherein the filter head base comprises a circumferential projection extending outwardly from an outer periphery of the filter head base, the circumferential projection structured to form a seal against the first end sealing member.

11. The filter assembly of claim 1, wherein the filter element further comprises:

a second end cap coupled to a filter media second end of the filter media opposite the filter media first end.

12. The filter assembly of claim 1, wherein the first end sealing member engages each of the first end cap flange, the protrusion, the housing ledge, and the housing flange in an uncompressed state.

13. A filter element configured to be positioned within an internal volume of a shell housing, the filter element comprising:

filter media; and a first end cap coupled to a filter media first end of the filter media, the first end cap comprising:

a base, a first axial sidewall extending from the base towards the filter media, the first axial sidewall positioned inwardly from an outer edge of the first end cap, a second axial sidewall extending from the outer edge of the base towards the filter media and spaced apart from the first axial sidewall, the filter media first end positioned between the first axial sidewall and the second axial sidewall, at least one clip positioned on the second axial sidewall, the at least one clip configured to removably engage with a ledge of the shell housing so as to removably secure the first end cap, and thereby the filter element, within the shell housing, a first end cap flange positioned about a periphery of the base and circumferentially aligned with the second axial sidewall, the first end cap flange engaged with and extending axially away from an upper surface of the base and away from the filter media, the first end cap flange defining a portion of a fluid opening through the first end cap, and a protrusion extending radially away from an outer surface of the first end cap away from the second axial sidewall, the outer surface defined by the first end cap flange and the second axial sidewall and oriented substantially perpendicular to the base, the protrusion disposed on the outer surface at an intermediate axial position between the first end cap flange and the second axial sidewall, the protrusion defining a first surface oriented in a perpendicular orientation with respect to the second axial sidewall and a second surface extending at an angle from the first surface in an at least partially radial direction toward the second axial sidewall, the protrusion configured to engage with the ledge of the shell housing so as to limit insertion of the filter element into the internal volume defined by the housing beyond a predetermined distance, wherein the first end cap flange and the protrusion form part of a U-shaped channel that receives a first end sealing member, wherein the protrusion does not extend along the second axial sidewall adjacent to the at least one clip.

14. The filter element of claim 13, wherein the base includes a central fluid opening, the end cap further comprising a plurality of tabs positioned between the first end cap flange and the central opening and surrounding the central fluid opening.

15. The filter element of claim 13, wherein the first end cap further comprises:
a fluid inlet defined in the base adjacent to the second axial sidewall; and
a fluid outlet defined within the first axial sidewall.

16. The filter element of claim 13, wherein the filter element further comprises a second end cap coupled to a filter media second end of the filter media opposite the filter media first end.

17. The filter assembly of claim 13, wherein the second surface is a curved surface.

18. The filter assembly of claim 13, wherein the first end cap further includes a protrusion disposed on an upper end of the first end cap flange that extends radially inward and overhangs a portion of the fluid opening.

19. A filter assembly, comprising:
a housing defining an internal volume, at least one male thread formed in a housing first end of the housing;
a filter element positioned within the internal volume of the housing, the filter element comprising:
filter media; and
a first end cap coupled to a filter media first end of the filter media, the first end cap comprising:
a base,
a first axial sidewall extending from the base towards the filter media, the first axial sidewall positioned inwardly from an outer edge of the first end cap,
a second axial sidewall extending from the outer edge of the base towards the filter media and spaced apart from the first axial sidewall, the filter media first end positioned between the first axial sidewall and the second axial sidewall,
at least one clip positioned on the second axial sidewall, the at least one clip configured to removably engage with a housing ledge of the housing so as to removably secure the first end cap, and thereby the filter element, within the housing,
a first end cap flange positioned about a periphery of the base and circumferentially aligned with the second axial sidewall, the first end cap flange engaged with and extending axially away from an upper surface of the base and away from the filter element, and
a protrusion extending radially away from an outer surface of the first end cap towards the housing, the outer surface defined by the first end cap flange and the second axial sidewall and oriented substantially perpendicular to the base, the protrusion disposed on the outer surface at an intermediate axial position between the first end cap flange and the second axial sidewall, the protrusion engaged with the housing ledge such that a top surface of the protrusion and a top surface of the housing ledge together define a substantially planar surface, wherein the protrusion does not extend along the second axial sidewall adjacent to the at least one clip; and a first end sealing member positioned between an outer surface of the first end cap flange and an inner surface of the housing first end, the first end sealing member engaging each of the first end cap flange, the protrusion, the housing ledge, and a housing flange, the first end sealing member forming a seal between the housing and the first end cap; and
a filter head to which the housing first end is removably coupled, the filter head comprising:
a filter head base; and
a filter head sidewall extending from an outer periphery of the filter head base towards the housing, a plurality of female threads defined on the filter head sidewall and structured to engage the at least one male thread of the housing so as to removably couple the filter head to the housing first end;
wherein a circumferential groove is defined on the filter head base, the circumferential groove structured to receive at least a portion of the first end sealing member.

20. A filter assembly, comprising:
a housing defining an internal volume, at least one male thread formed in a housing first end of the housing;
a filter element positioned within the internal volume of the housing, the filter element comprising:
filter media; and
a first end cap coupled to a filter media first end of the filter media, the first end cap comprising:
a base,
a first axial sidewall extending from the base towards the filter media, the first axial sidewall positioned inwardly from an outer edge of the first end cap,
a second axial sidewall extending from the outer edge of the base towards the filter media and spaced apart from the first axial sidewall, the filter media first end positioned between the first axial sidewall and the second axial sidewall,
at least one clip positioned on the second axial sidewall, the at least one clip configured to removably engage with a housing ledge of the housing so as to removably secure the first end cap, and thereby the filter element, within the housing,
a first end cap flange positioned about a periphery of the base and circumferentially aligned with the second axial sidewall, the first end cap flange engaged with and extending axially away from an upper surface of the base and away from the filter element, and
a protrusion extending radially away from an outer surface of the first end cap towards the housing, the outer surface defined by the first end cap flange and the second axial sidewall and oriented substantially perpendicular to the base, the protrusion disposed on the outer surface at an intermediate axial position between the first end cap flange and the second axial sidewall, the protrusion engaged with the housing ledge such that a top surface of the protrusion and a top surface of the housing ledge together define a substantially planar surface, wherein the protrusion does not extend along the second axial sidewall adjacent to the at least one clip; and
a first end sealing member positioned between an outer surface of the first end cap flange and an inner surface of the housing first end, the first end sealing member engaging each of the first end cap flange, the protrusion, the housing ledge, and a housing flange, the first end sealing member forming a seal between the housing and the first end cap; and a filter head to which the housing first end is removably coupled, the filter head comprising:

a filter head base comprising a circumferential projection extending outwardly from an outer periphery of the filter head base, the circumferential projection structured to form a seal against the first end sealing member; and a filter head sidewall extending from an outer periphery of the filter head base towards the housing, a plurality of female threads defined on the filter head sidewall and structured to engage the at least one male thread of the housing so as to removably couple the filter head to the housing first end.

21. A filter element configured to be positioned within an internal volume of a shell housing, the filter element comprising:

filter media; and a first end cap coupled to a filter media first end of the filter media, the first end cap comprising:

a base, a first axial sidewall extending from the base towards the filter media, the first axial sidewall positioned inwardly from an outer edge of the first end cap, a second axial sidewall extending from the outer edge of the base towards the filter media and spaced apart from the first axial sidewall, the filter media first end positioned between the first axial sidewall and the second axial sidewall, at least one clip positioned on the second axial sidewall, the at least one clip configured to removably engage with a ledge of the shell housing so as to removably secure the first end cap, and thereby the filter element, within the shell housing, wherein the second axial sidewall of the first end cap includes a first cutaway positioned on a first side of a clip of the at least one clip, and a second cutaway positioned on a second side of the clip, the first cutaway and the second cutaway allowing the clip to flex during installation of the filter element into the housing, a first end cap flange positioned about a periphery of the base and circumferentially aligned with the second axial sidewall, the first end cap flange engaged with and extending axially away from an upper surface of the base and away from the filter media, the first end cap flange defining a portion of a fluid opening through the first end cap, and a protrusion extending radially away from an outer surface of the first end cap away from the second axial sidewall, the outer surface defined by the first end cap flange and the second axial sidewall and oriented substantially perpendicular to the base, the protrusion disposed on the outer surface at an intermediate axial position between the first end cap flange and the second axial sidewall, the protrusion defining a first surface oriented in a perpendicular orientation with respect to the second axial sidewall and a second surface extending at an angle from the first surface in an at least partially radial direction toward the second axial sidewall, wherein the protrusion does not extend along the second axial sidewall adjacent to the at least one clip.

* * * * *